US 10,780,523 B1

(12) United States Patent
Sargent

(10) Patent No.: US 10,780,523 B1
(45) Date of Patent: Sep. 22, 2020

(54) EDDY CURRENT MONITORING IN AN ADDITIVE MANUFACTURING CONTINUOUS WELDING SYSTEM

(71) Applicant: Lockheed Martin Corporation, Bethesda, MD (US)

(72) Inventor: Kenneth R. Sargent, Monteverde, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1359 days.

(21) Appl. No.: 14/875,033

(22) Filed: Oct. 5, 2015

(51) Int. Cl.
| B23K 26/03 | (2006.01) |
| B23K 15/00 | (2006.01) |
| B23K 15/02 | (2006.01) |
| B23K 26/342 | (2014.01) |
| G01N 27/72 | (2006.01) |
| B33Y 10/00 | (2015.01) |

(Continued)

(52) U.S. Cl.
CPC ...... B23K 26/0342 (2015.10); B23K 15/0086 (2013.01); B23K 15/02 (2013.01); B23K 26/342 (2015.10); G01N 27/72 (2013.01); B33Y 10/00 (2014.12); B33Y 30/00 (2014.12); B33Y 50/02 (2014.12)

(58) Field of Classification Search
CPC .............. B23K 15/0086; B23K 15/02; B23K 26/0342; B23K 26/342; B33Y 10/00; B33Y 30/00; B33Y 50/02; G01N 27/72; G05B 2219/49018; B22F 2003/1056; B22F 2003/1057; H01J 37/315
See application file for complete search history.

(56) References Cited

U.S. PATENT DOCUMENTS

| 5,301,863 A | 4/1994 | Prinz et al. |
| 7,188,532 B2 | 3/2007 | Goldfine et al. |

(Continued)

FOREIGN PATENT DOCUMENTS

| CA | 2952633 A1 * | 12/2015 | ........ B23K 26/346 |
| FR | 3010334 A1 | 3/2015 | |
| JP | 2005262218 A | 9/2005 | |

OTHER PUBLICATIONS

Examination Report for European Patent Application No. 16169948.3, dated Oct. 24, 2018, 6 pages.

(Continued)

*Primary Examiner* — Dana Ross
*Assistant Examiner* — James F Sims, III
(74) *Attorney, Agent, or Firm* — Withrow & Terranova, PLLC

(57) ABSTRACT

An AM continuous welding system (AMCWS) is provided. The AMCWS includes a feedstock dispenser that configured to emit feedstock at a designated location, and a heat source configured to heat the feedstock. The AMCWS also includes a first eddy current sensor array that is configured to generate a first plurality of sensor signals while in current-sensing proximity of a re-solidified feedstock segment. A controller is coupled to the first eddy current sensor array and is configured to determine, based on the first plurality of sensor signals, a first characteristic of the re-solidified feedstock segment. The controller determines that the first characteristic is a first undesirable characteristic, and initiates an action based on the first undesirable characteristic.

18 Claims, 5 Drawing Sheets

(51) Int. Cl.
*B33Y 30/00* (2015.01)
*B33Y 50/02* (2015.01)

(56) References Cited

U.S. PATENT DOCUMENTS

| | | | |
|---|---|---|---|
| 8,784,721 | B2 | 7/2014 | Philippi et al. |
| 2004/0173946 | A1 | 9/2004 | Pfeifer et al. |
| 2005/0173380 | A1 | 8/2005 | Carbone |
| 2005/0202660 | A1 | 9/2005 | Cohen et al. |
| 2007/0176312 | A1 | 8/2007 | Clark et al. |
| 2009/0206065 | A1 | 8/2009 | Kruth et al. |
| 2011/0114839 | A1* | 5/2011 | Stecker .............. B22F 3/1055 250/307 |
| 2014/0159266 | A1* | 6/2014 | Bamberg ............. B22F 3/1055 264/40.1 |
| 2014/0163717 | A1 | 6/2014 | Das et al. |
| 2015/0321422 | A1 | 11/2015 | Boyer |
| 2016/0214319 | A1 | 7/2016 | Wiel et al. |
| 2017/0136704 | A1* | 5/2017 | Giulietti ................ G05B 15/02 |
| 2017/0304947 | A1* | 10/2017 | Shibazaki ............. B33Y 10/00 |

OTHER PUBLICATIONS

Final Office Action for U.S. Appl. No. 14/715,713, dated Dec. 29, 2017, 13 pages.
Advisory Action for U.S. Appl. No. 14/715,713, dated Mar. 22, 2018, 3 pages.
Non-Final Office Action for U.S. Appl. No. 14/715,713, dated Sep. 8, 2017, 11 pages.
Zur Jacobsmühlen, Joschka, et al., "High Resolution Imaging for Inspection of Laser Beam Melting Systems," 2013 IEEE International Instrumentation and Measurement Technology Conference (I2MTC), May 6-9, 2013, Minneapolis, MN, IEEE, 6 pages.
Extended European Search Report for European Patent Application No. 16169948.3, dated Oct. 25, 2016, 9 pages.

* cited by examiner

EDDY CURRENT MONITORING IN AN ADDITIVE MANUFACTURING CONTINUOUS WELDING SYSTEM

TECHNICAL FIELD

The embodiments relate generally to additive manufacturing (AM) processes, and in particular to in-process monitoring in an AM continuous welding system.

BACKGROUND

Additive manufacturing (AM) is a work piece manufacturing process by which a work piece is manufactured one layer at a time. AM has certain advantages over traditional manufacturing techniques, including less wasted material and reduced labor costs.

A continuous welding system is an AM process that uses layers of metal feedstock to make a work piece. A continuous welding system includes a feedstock dispenser that emits the metal feedstock, and a heat source, such as a laser or electron beam, that heats the feedstock, forming a melt pool. The melt pool cools and re-solidifies on top of the previous layer. The layers are built up in a desired pattern to form the work piece. Post processing may be necessary or desirable to ensure a proper finish dimension.

AM has some disadvantages. AM may take substantially longer to generate a work piece than conventional forging, stamping, or molding techniques. It may take hours to generate a single work piece. Further, because of the need for specialized and relatively expensive AM tools, AM may not be suitable for mass production of low-cost work pieces. Moreover, AM does not always result in perfect work pieces. In the context of an AM continuous welding system, a few potentially problematic areas are layer deviation, layer separation, cracking, and porosity issues.

Another disadvantage of AM is that it is difficult or impractical to inspect the work piece prior to completion. Thus, after a work piece is completed, the work piece may be inspected only to determine that shortly after the AM process began, the work piece distorted, the feedstock was emitted at too high or too low of a rate, or another issue, resulting in a defective work piece that must be discarded. This results in material waste and perhaps worse, a substantial reduction in manufacturing throughput.

It may also be very difficult or impossible to properly inspect a work piece after the work piece has been completely manufactured, due to the geometry of the part, the thickness of the portions of the work piece, or other reasons. Thus, a work piece may have a latent defect that is not detected in a post-manufacturing process and may be installed on a machine only to subsequently fail due to an inability to properly inspect the work piece.

SUMMARY

The embodiments relate to an additive manufacturing (AM) continuous welding system, and related methods, that concurrently monitor material layers, such as welded feedstock layers, or portions thereof, for one or more defects as a work piece is being manufactured. If, based on the monitoring, an undesirable characteristic of a welded feedstock segment is identified, such as an undesirable porosity characteristic, an undesirable location characteristic, and/or an undesirable separation characteristic, an action is taken. The action may be any one or more of halting the AM process, presenting a message on a display device regarding the undesirable characteristic, or one or more operational parameters of the AM continuous welding system may be altered to reduce or eliminate the undesirable characteristic from subsequent feedstock layers.

In one embodiment, an AM continuous welding system (AMCWS) is provided. The AMCWS includes a feedstock dispenser that configured to emit feedstock at a designated location, and a heat source configured to heat the feedstock. The AMCWS also includes a first eddy current sensor array that is configured to generate a first plurality of sensor signals while in current-sensing proximity of a re-solidified feedstock segment. A controller is coupled to the first eddy current sensor array and is configured to determine, based on the first plurality of sensor signals, a first characteristic of the re-solidified feedstock segment. The controller determines that the first characteristic is a first undesirable characteristic, and initiates an action based on the first undesirable characteristic.

In one embodiment, the undesirable characteristic of the re-solidified feedstock segment is a location of the re-solidified feedstock segment. The controller is configured to access slice data that identifies a specified location of the re-solidified feedstock segment, compare the actual location of the re-solidified feedstock segment to the specified location of the re-solidified feedstock segment to determine a location deviation, and determine that the location deviation exceeds a predetermined threshold. The controller is further configured to alter a parameter of the AM continuous welding system to reduce a location deviation of a subsequent re-solidified feedstock segment.

In one embodiment, the controller is configured to move the feedstock dispenser from a current location to a new location to reduce the location deviation of the subsequent re-solidified feedstock segment. In another embodiment, the controller is configured to move a platform that supports the work piece from a current location to a new location.

In one embodiment, the undesirable characteristic of the re-solidified feedstock segment is a porosity of the re-solidified feedstock segment. The controller is further configured to compare the actual porosity of the re-solidified feedstock segment to an intended porosity of the re-solidified feedstock segment to determine a porosity deviation. The controller determines that the porosity deviation exceeds a predetermined threshold, and alters a parameter of the additive manufacturing welding system to reduce a porosity deviation of a subsequent re-solidified feedstock segment.

In one embodiment, to reduce the porosity deviation of a subsequent re-solidified feedstock segment, the controller is configured to alter a speed at which the feedstock dispenser and the work piece move with respect to one another.

In one embodiment, the undesirable characteristic of the re-solidified feedstock segment comprises a separation of the re-solidified feedstock segment from a previous re-solidified feedstock segment. The controller is further configured to determine the separation of the re-solidified feedstock segment from the previous re-solidified feedstock segment, and to present a message on a display device that comprises an image that depicts the work piece in a partially completed state that corresponds to an actual partially completed state of the work piece, and identifies a location of the first undesirable characteristic with respect to the work piece.

In one embodiment, the controller determines that the separation is less than a predetermined threshold, and increases an interpass time period that identifies a wait period between each successive feedstock segment.

In one embodiment the first eddy current sensor array is fixed with respect to the feedstock dispenser.

In one embodiment the AM continuous welding system includes a second eddy current sensor array that is configured to, concurrently with the first eddy current sensor array, generate a second plurality of sensor signals while in current-sensing proximity of a re-solidified feedstock segment.

In one embodiment, the controller is configured to halt processing of the AM continuous welding system.

In one embodiment, the heat source comprises an electron beam. In another embodiment, the heat source comprises a laser beam.

In another embodiment, a method for additive manufacturing (AM) is provided. The method includes emitting feedstock at a designated location, and heating the feedstock. The method further includes generating a plurality of sensor signals while in current-sensing proximity of a re-solidified feedstock segment, determining, based on the first plurality of sensor signals, a first characteristic of the re-solidified feedstock segment. The method further includes determining that the first characteristic of the re-solidified feedstock segment is an undesirable characteristic, and initiating an action based on the undesirable characteristic.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first characteristic" and "second first," and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to an additive manufacturing (AM) continuous welding system, and related methods, that concurrently monitor material layers, such as feedstock layers, or portions thereof, for one or more defects as a work piece is being manufactured. If, based on the monitoring, an undesirable characteristic of a feedstock segment is identified, such as an undesirable porosity characteristic, an undesirable location characteristic, and/or an undesirable separation characteristic, an action is taken. The action may be any one or more of halting the AM process, presenting a message on a display device regarding the undesirable characteristic, or one or more operational parameters of the AM continuous welding system may be altered to reduce or eliminate the undesirable characteristic from subsequent feedstock layers.

Figure 1:
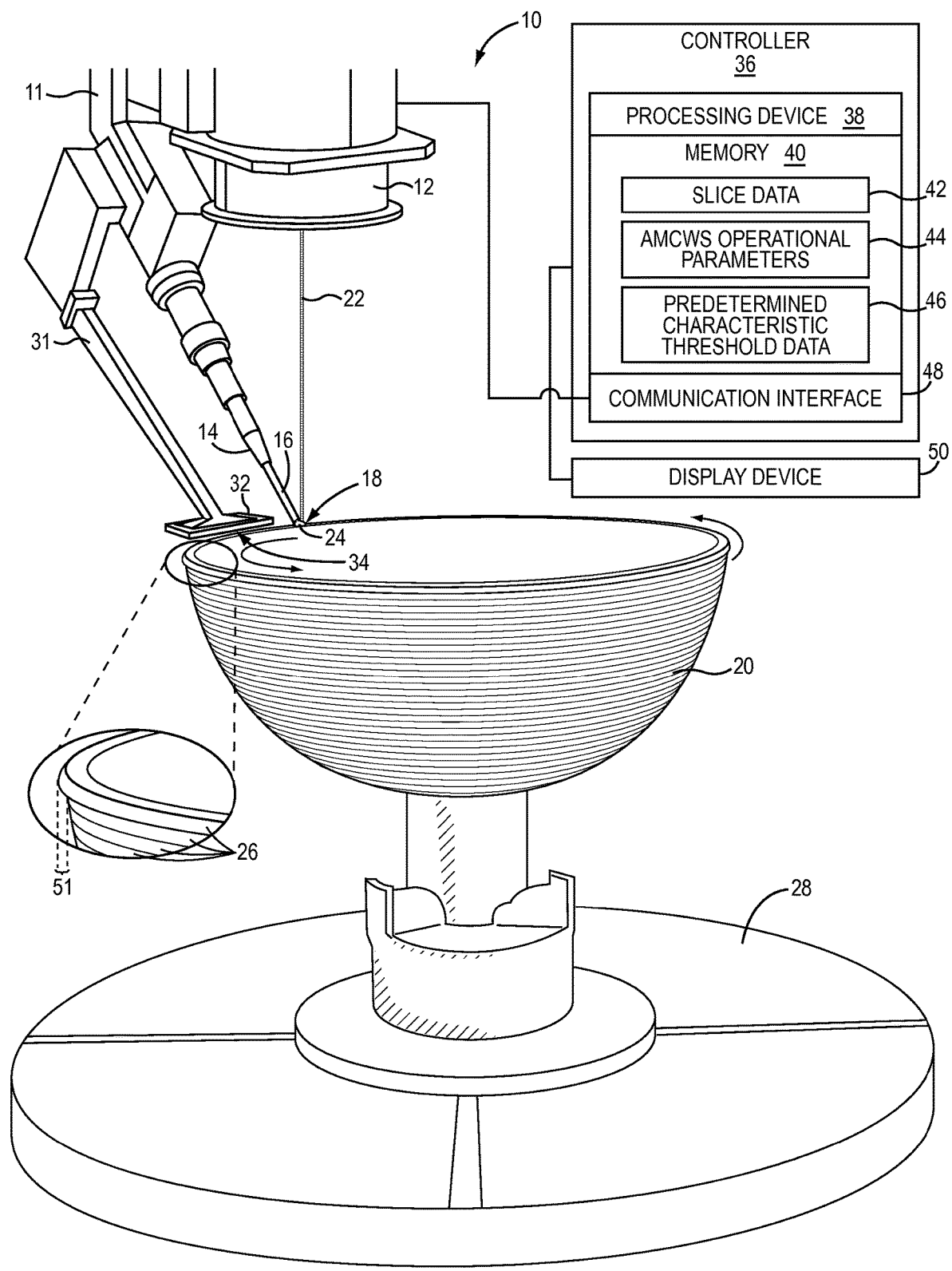
FIG. 1 is a diagram of a portion of an additive manufacturing (AM) continuous welding system (AMCWS), according to one embodiment.

FIG. 1 is a diagram of a portion of an AM continuous welding system (AMCWS) 10, according to one embodiment. Portions of the AMCWS 10 have been omitted for clarity. The AMCWS 10 includes a material deposition device 11 that applies layers of feedstock, in this example, metallic feedstock, to form a work piece. While the embodiments have applicability to any feedstock, solely for purposes of illustration, the embodiments will be discussed herein in the context of feedstock that comprises a wire. The material deposition device 11 includes a heat source 12 and a feedstock dispenser 14. The heat source 12 may comprise any suitable heat source utilized for an AM system, including, by way of non-limiting example, a laser beam, an electron beam, an arc deposition device, a friction-stir welding apparatus, or the like. The feedstock dispenser 14 is configured to emit a feedstock 16 at a designated location 18 on a work piece 20. The heat source 12 is configured to heat the feedstock 16. The heat source 12 in this example emits an electron beam 22 at the designated location 18, causing the feedstock 16 to melt and form a melt pool 24. The melt pool 24 ultimately re-solidifies, chemically bonding with a previous re-solidified feedstock segment, typically a portion of a previous feedstock layer 26. The feedstock 16 may comprise any suitable material. In one embodiment, the feedstock 16 comprises titanium.

The process is continuous and thus the feedstock dispenser 14 and the work piece 20 move with respect to one another. The relative movement may be caused by movement of the work piece 20, movement of the feedstock dispenser 14, or both. Thus the embodiments have applicability in AM continuous welding systems wherein the feedstock dispenser 14 is fixed, and in AM continuous welding systems wherein the feedstock dispenser 14 is capable of movement. The work piece 20 is formed on a platform 28. In some embodiments the platform 28 is capable of movement. For example, the platform 28 may be capable of rotation, and thus may rotate the work piece 20 at a predetermined rate of rotation with respect to the feedstock dispenser 14.

The AMCWS 10 includes a controller 36 that operates the feedstock dispenser 14, heat source 12, the platform 28 if separately operable, and other components as discussed herein. The AMCWS 10 also includes an eddy current sensor array holder 31 that holds a first eddy current sensor array 32 that is configured to generate a first plurality of sensor signals while in current-sensing proximity of a re-solidified feedstock segment 34. Preferably the first eddy current sensor array 32 is not in contact with the re-solidified feedstock segment 34, but is positioned sufficiently closely to the re-solidified feedstock segment 34 that the first eddy current sensor array 32 is capable of emitting and sensing the appropriate eddy current feedback signals.

The controller 36 includes a processing device 38 and a memory 40. The memory 40 may include slice data 42 which identifies for each feedstock layer of the work piece 20, the precise location of the respective feedstock layer. The slice data 42, among other things, may be used by the controller 36 to drive the material deposition device 11 and/or the platform 28. The slice data 42 may be generated by any suitable work piece design module, such as a computer-aided design and computer-aided manufacturing design module. The memory 40 may also comprise AMCWS operational parameters 44, which direct operational aspects of the AMCWS 10, such as a rate of speed at which the feedstock 16 is emitted from the feedstock dispenser 14, a rate of speed of rotation of the platform 28 and/or movement of the material deposition device 11, an interpass time period that identifies a delay between successive feedstock layers, and the like. The memory 40 may also include predetermined characteristic threshold data 46 that facilitates a determination by the controller 36 whether a characteristic of the re-solidified feedstock segment is desirable, or undesirable. The controller 36 may also include one or more communication interfaces 48 that facilitate communication with the material deposition device 11, the platform 28, and/or a network (not illustrated). In some embodiments, the controller 36 may also be communicatively coupled to a display device 50, which may be used to present information to an operator, for example.

In one embodiment, the first eddy current sensor array 32 comprises a plurality of differential probes, each differential probe comprising a plurality of coils. In some embodiments, each differential probe may comprise two coils, wound in opposition to one another. The first eddy current sensor array 32 may comprise any desired resolution of differential probes, such as four differential probes per inch, more than four differential probes per inch, or fewer than four differential probes per inch. As the first eddy current sensor array 32 moves with respect to the re-solidified feedstock segment 34, the first eddy current sensor array 32 generates a first plurality of sensor signals. The first plurality of sensor signals may be continuously communicated to the controller 36 as the first eddy current sensor array 32 moves over the work piece 20. In one embodiment, the first plurality of sensor signals comprises a plurality of differential signals that identify differences between the coils in the plurality of differential probes.

Based on the first plurality of sensor signals, the controller 36 is configured to determine a first characteristic of the re-solidified feedstock segment 34. The particular characteristic may comprise any characteristics determinable via the first eddy current sensor array 32, including, by way of non-limiting example, a process deviation characteristic, a location characteristic, a distortion characteristic, metallurgical characteristic, a volumetric characteristic, a porosity characteristic, and/or a layer separation characteristic.

The controller 36 may determine that the first characteristic is undesirable. For example, if the characteristic is a location characteristic, the controller 36 may access the slice data 42 to determine a specified location (or locations) of the re-solidified feedstock segment 34. The controller 36 may compare the actual location of the re-solidified feedstock segment 34 to the specified location of the re-solidified feedstock segment 34 to determine a location deviation 51. The controller 36 may access the predetermined characteristic threshold data 46, and determine that the location deviation 51 exceeds a predetermined threshold. The controller 36 may then initiate an action based on the undesirable characteristic. For example, the controller 36 may alter one or more AMCWS operational parameters 44 to reduce the location deviation of a subsequent re-solidified feedstock segment 34. For example, the controller 36 may move the feedstock dispenser 14 from a current location to a new location. Additionally, or alternatively, the controller 36 may move the platform 28 from a current location to a new location. Additionally, or alternatively, the controller 36 may halt processing of the AMCWS 10. Additionally, or alternatively, the controller 36 may present a message on the display device 50.

As another example, if the characteristic is a porosity characteristic, the controller 36 may access the predetermined characteristic threshold data 46 to determine a predetermined intended porosity, or a range of acceptable porosities. The controller 36 may compare the actual porosity of the re-solidified feedstock segment 34 to the intended porosity of the re-solidified feedstock segment to determine a porosity deviation. The controller 36 may determine that the porosity deviation exceeds a predetermined threshold, and may alter a parameter of the AMCWS 10 to reduce a porosity deviation of a subsequent re-solidified feedstock segment 34. For example, the controller 36 may alter a speed at which the feedstock dispenser 14 and the work piece 20 move with respect to one another, or may alter an energy of the electron beam 22.

In one embodiment, the eddy current sensor array holder 31 holds a plurality of eddy current sensor arrays 32. Each eddy current sensor array 32 is configured to generate a corresponding plurality of sensor signals. The corresponding pluralities of sensor signals are provided to the controller 36. Each eddy current sensor array 32 may be configured to generate sensor signals appropriate to identify different characteristics. Thus, the controller 36 may concurrently determine a location characteristic, a porosity characteristic, and a layer separation characteristic, for example.

In one embodiment the controller 36 generates a display model of the workpiece 20 that is concurrently presented on the display device 50 as the workpiece 20 is being formed. The display model may depict each characteristic that deviates beyond a particular threshold on the workpiece 20. This display model may also be stored in the memory 40 for subsequent analysis.

Figure 2:
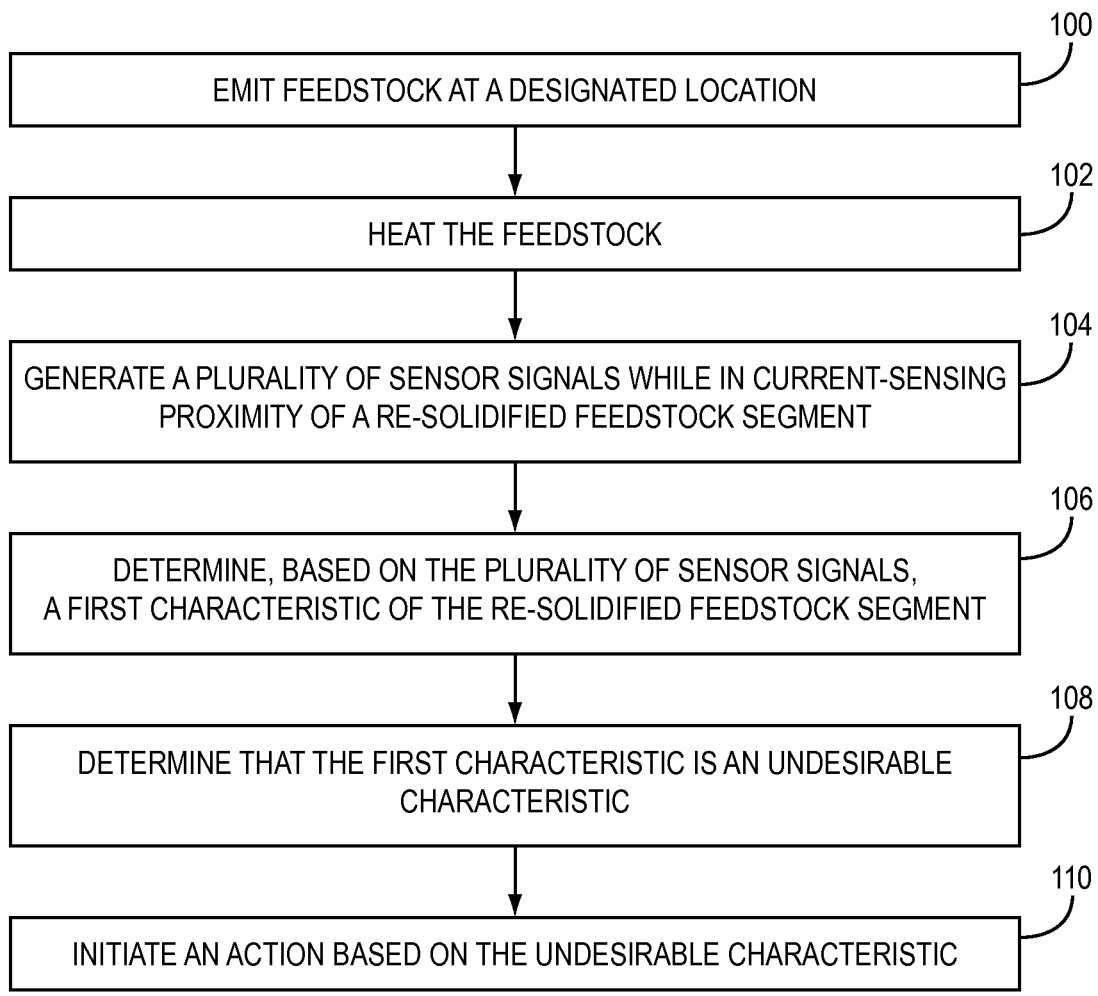
FIG. 2 is a method for AM according to one embodiment.

FIG. 2 is a method for AM according to one embodiment. FIG. 2 will be discussed in conjunction with FIG. 1. The feedstock dispenser 14 emits the feedstock 16 at the designated location 18 on the work piece 20 (block 100). The electron beam 22 heats the feedstock 16, forming a melt pool 24 (block 102). The eddy current sensor array 32 generates a plurality of sensor signals while in current-sensing proximity of the re-solidified feedstock segment 34 (block 104). The length or area of the re-solidified feedstock segment 34 may comprise any desired length or area, or may be defined by that amount of the recently re-solidified feedstock 16 that can be sensed at a given time by the eddy current sensor array 32. Thus, a single layer of the work piece 20 may comprise hundreds or thousands of re-solidified feedstock segments 34. In other embodiments, the re-solidified feedstock segment 34 may be defined as a complete feedstock layer of the work piece 20.

The controller 36 determines, based on the first plurality of sensor signals, a first characteristic of the re-solidified feedstock segment 34 (block 106). As discussed above, the characteristic may comprise any characteristic that is detectable or quantifiable via eddy current sensing technology. By way of non-limiting example, the characteristic may comprise a location characteristic, a distortion characteristic, metallurgical characteristic, a volumetric characteristic, a porosity characteristic, and/or a layer separation characteristic. The controller 36 determines that the first characteristic of the re-solidified feedstock segment 34 is an undesirable characteristic (block 108). The controller 36 may then initiate an action based on the undesirable characteristic (block 110).

Figure 3:
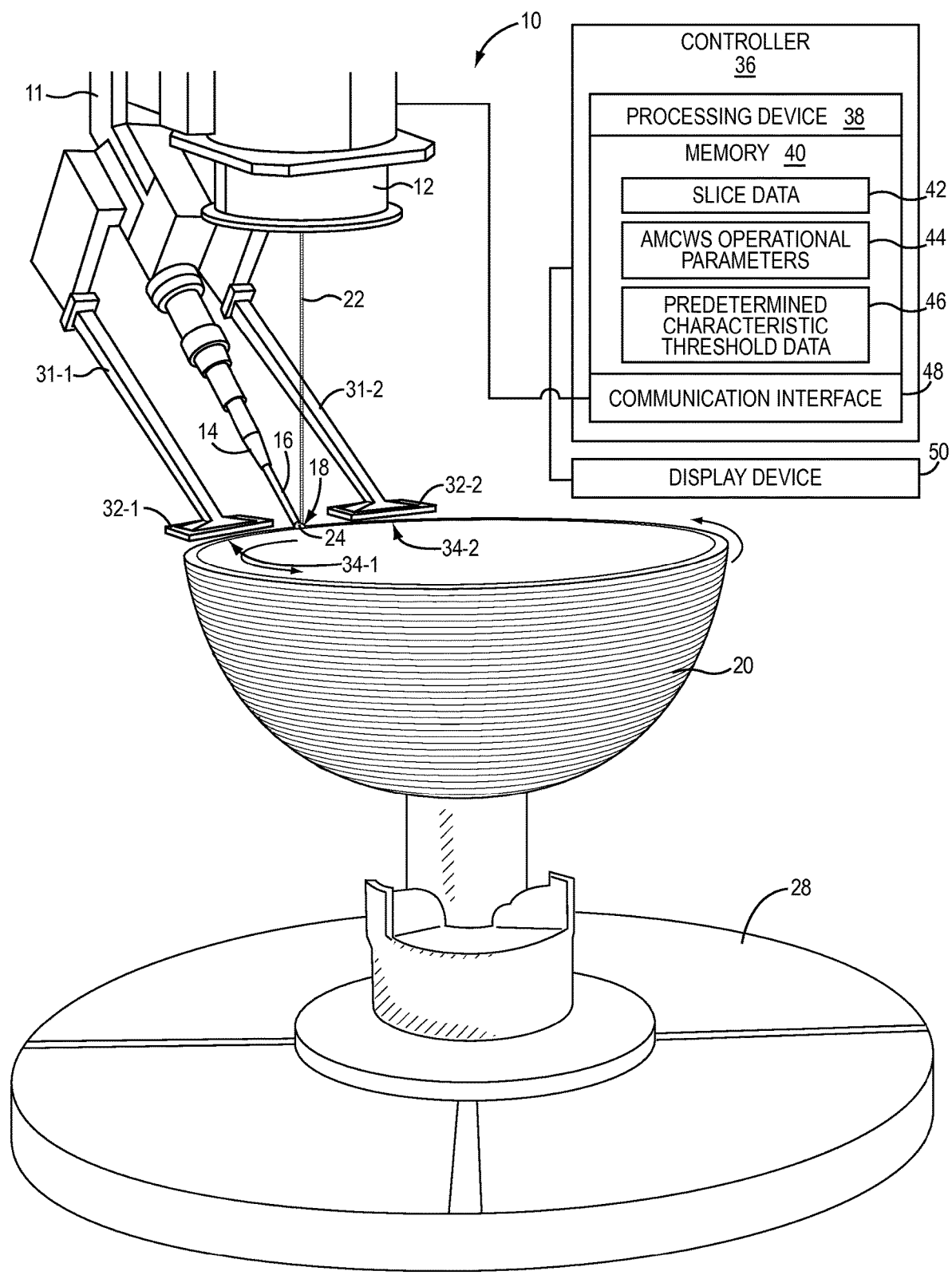
FIG. 3 is a diagram of a portion of an AMCWS according to another embodiment.

FIG. 3 is a diagram of a portion of an AMCWS 10-1 according to another embodiment. In this embodiment, the AMCWS 10-1 is substantially similar to the AMCWS 10 discussed above with regard to FIGS. 1 and 2, but contains a first eddy current sensor array holder 31-1 that holds a first eddy current sensor array 32-1, and a second eddy current sensor array holder 31-2 that holds a second eddy current sensor array 32-2. The eddy current sensor arrays 32-1, 32-2 may concurrently send corresponding sensor signals to the controller 36. The first eddy current sensor array 32-1 generates sensor signals while in current sensing proximity to a first re-solidified feedstock segment 34-1, and the second eddy current sensor array 32-2 generates sensor signals while in current sensing proximity to a second re-solidified feedstock segment 34-2. Note that the first re-solidified feedstock segment 34-1 has re-solidified for a lesser period of time than the second re-solidified feedstock segment 34-2, and thus the second re-solidified feedstock segment 34-2 is at a lower temperature than the first re-solidified feedstock segment 34-1. This may be desirable when certain characteristics are better quantified at lower temperatures than higher temperatures. In some embodiments, the AMCWS 10 may apply a feedstock layer, and then inhibit the emission of the feedstock 16 from the feedstock dispenser 14 for a period of time to allow the feedstock layer to cool. The AMCWS 10 may then move the eddy current sensor arrays 32-1, 32-2 (or, the eddy current sensor array 32 where only a single eddy current sensor array 32 is utilized) with respect to the most recently applied feedstock layer to analyze the most recently applied feedstock layer for one or more characteristics, as discussed above. If each analyzed characteristic is within a desirable predetermined range, or value, the AMCWS 10 applies a next feedstock layer. Otherwise, the AMCWS 10 initiates an action.

Figure 4:
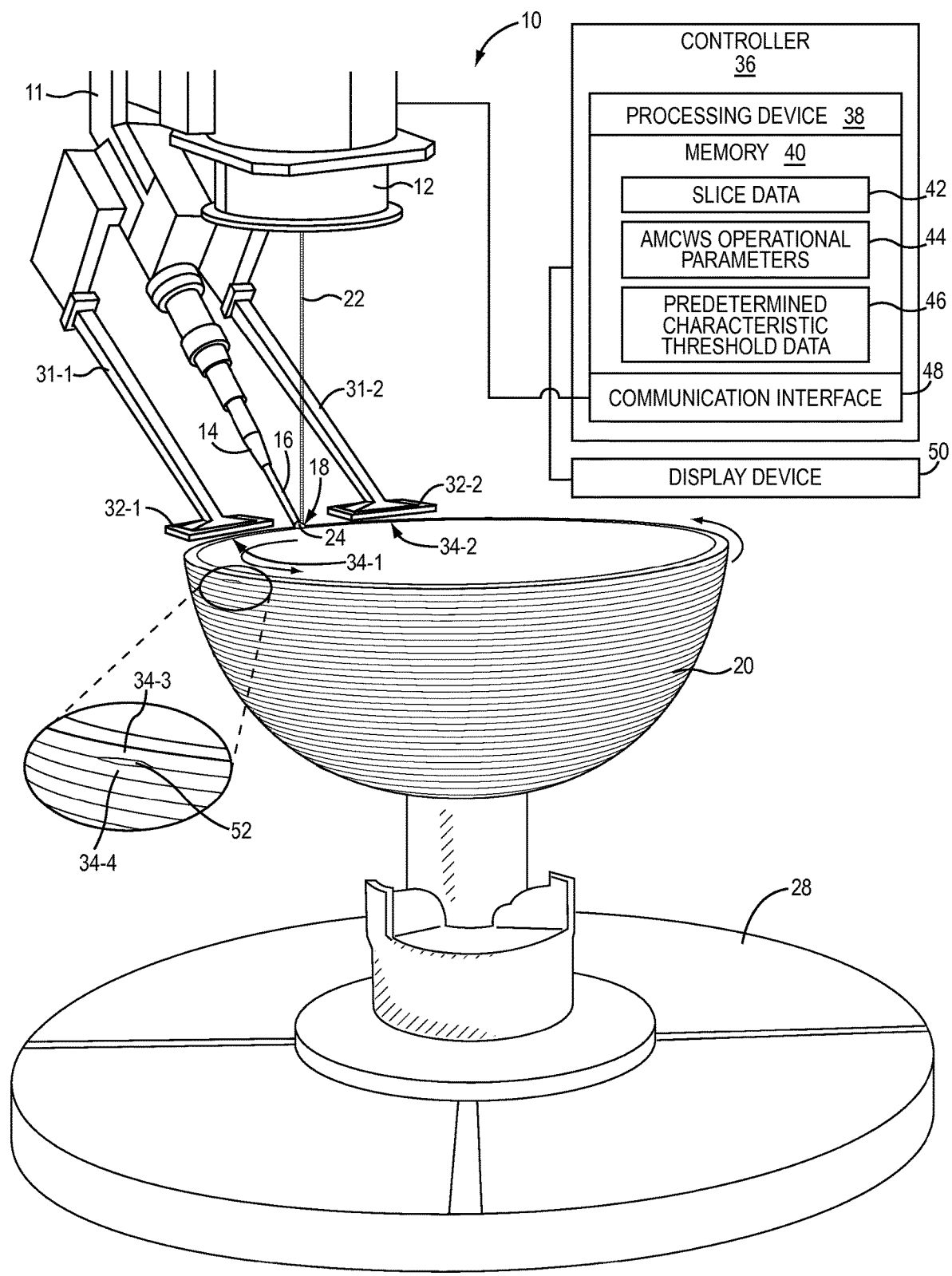
FIG. 4 is a diagram of the AMCWS illustrated in FIG. 3, wherein a work piece contains an undesirable characteristic, according to one embodiment.

FIG. 4 is a diagram of the AMCWS illustrated in FIG. 3, wherein the work piece 20 contains an undesirable characteristic, according to one embodiment. In particular, based on the sensor signals received from the eddy current sensor array 32-1, the controller 36 determines that a re-solidified feedstock segment 34-3 has separated from a previous re-solidified feedstock segment 34-4. Thus, a separation 52 exists between the re-solidified feedstock segment 34-3 and the re-solidified feedstock segment 34-4. In one example, the controller 36, based on the predetermined characteristic threshold data 46, determines that the separation 52 is less than a predetermined threshold. The controller 36 alters an AMCWS operational parameter 44, such as an interpass time period that identifies a wait period between each successive feedstock segment, or feedstock layer.

Figure 5:
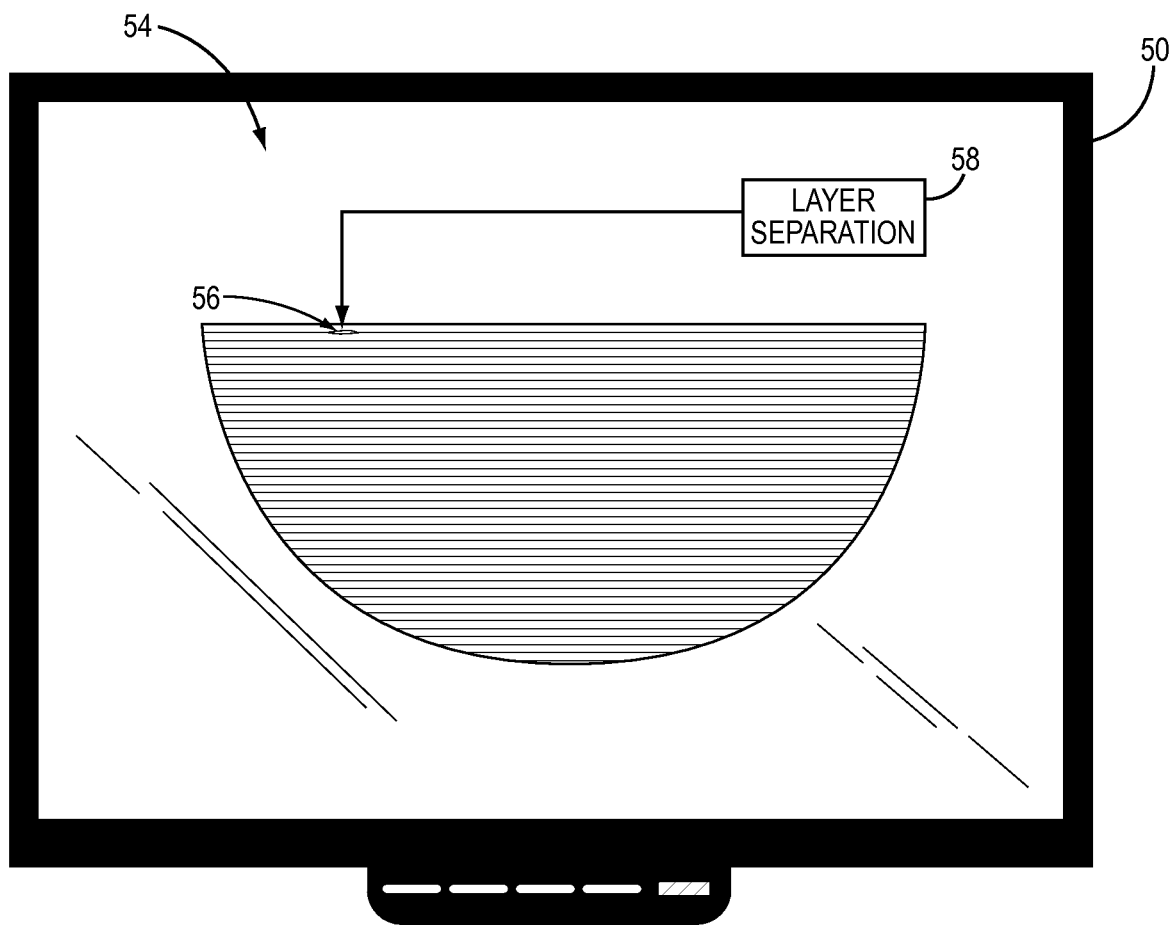
FIG. 5 is a diagram of the display device according to one embodiment.

FIG. 5 is a diagram of the display device 50 according to one embodiment. FIG. 5 will be discussed in conjunction with FIG. 4. Referring first to FIG. 4, assume that the controller 36, based on the predetermined characteristic threshold data 46, determines that the separation 52 is greater than a predetermined threshold. The controller 36 may halt subsequent movement of the work piece 20 and/or the material deposition device 11, and generate a message.

The message may comprise an image 54 that depicts the work piece 20 in a partially completed state that corresponds to an actual partially completed state of the work piece 20, and identifies a location 56 of the separation 52 with respect to the work piece 20. The message may also include graphical or textual information 58 identifying the particular undesirable characteristic.

Those skilled in the art will recognize improvements and modifications to the preferred embodiments of the disclosure. All such improvements and modifications are considered within the scope of the concepts disclosed herein and the claims that follow.

What is claimed is:

1. An additive manufacturing (AM) continuous welding system, comprising:
a feedstock dispenser configured to emit feedstock at a designated location, the feedstock comprising a wire;
a heat source configured to heat the feedstock;
a first eddy current sensor array configured to generate a first plurality of sensor signals while in current-sensing proximity of a re-solidified feedstock segment of a work piece; and
a controller comprising a processor coupled to the first eddy current sensor array and configured to:
determine, based on the first plurality of sensor signals, a first characteristic of the re-solidified feedstock segment;
determine that the first characteristic is a first undesirable characteristic, wherein the first undesirable characteristic of the re-solidified feedstock segment comprises a separation of the re-solidified feedstock segment from a previous re-solidified feedstock segment;
determine the separation of the re-solidified feedstock segment from the previous re-solidified feedstock segment;
determine that the separation is less than a predetermined threshold; and
initiate an action based on the first undesirable characteristic by increasing an interpass time period that identifies a wait period between each successive feedstock segment.

2. The AM continuous welding system of claim 1, wherein the controller is further configured to determine a second undesirable characteristic of the re-solidified feedstock segment based on a second plurality of sensor signals, the second undesirable characteristic comprising an actual location of the re-solidified feedstock segment, and wherein the controller is further configured to:
access slice data that identifies a specified location of the re-solidified feedstock segment;
compare the actual location of the re-solidified feedstock segment to the specified location of the re-solidified feedstock segment to determine a location deviation;
determine that the location deviation exceeds a predetermined threshold; and
alter a parameter of the AM continuous welding system to reduce a location deviation of a subsequent re-solidified feedstock segment.

3. The AM continuous welding system of claim 2, wherein to alter the parameter of the AM continuous welding system to reduce the location deviation of the subsequent re-solidified feedstock segment, the controller is configured to move the feedstock dispenser from a current location to a new location.

4. The AM continuous welding system of claim 2, further comprising a platform configured to support the work piece, and wherein to alter the parameter of the additive manufacturing welding system to reduce the location deviation of the subsequent re-solidified feedstock segment, the controller is configured to move the platform from a current location to a new location.

5. The AM continuous welding system of claim 1, wherein the controller is further configured to determine a second undesirable characteristic of the re-solidified feedstock segment based on a second plurality of sensor signals, the second undesirable characteristic comprising an actual porosity of the re-solidified feedstock segment, and wherein the controller is further configured to:
 compare the actual porosity of the re-solidified feedstock segment to an intended porosity of the re-solidified feedstock segment to determine a porosity deviation;
 determine that the porosity deviation exceeds a predetermined threshold; and
 alter a parameter of the additive manufacturing welding system to reduce a porosity deviation of a subsequent re-solidified feedstock segment.

6. The AM continuous welding system of claim 5, wherein to alter the parameter of the additive manufacturing welding system to reduce the porosity deviation of the subsequent re-solidified feedstock segment, the controller is configured to alter a speed at which the feedstock dispenser and the work piece move with respect to one another.

7. The AM continuous welding system of claim 1, wherein to initiate the action based on the first undesirable characteristic, the controller is configured to present a message.

8. The AM continuous welding system of claim 1, wherein the first eddy current sensor array is fixed with respect to the feedstock dispenser.

9. The AM continuous welding system of claim 1, further comprising a second eddy current sensor array configured to concurrently with the first eddy current sensor array generate a second plurality of sensor signals while in current-sensing proximity of a re-solidified feedstock segment.

10. The AM continuous welding system of claim 9, wherein the controller is coupled to the second eddy current sensor array and is further configured to:
 determine, based on the second plurality of sensor signals, a second undesirable characteristic of the re-solidified feedstock segment; and wherein to initiate the action based on the first undesirable characteristic, the controller is configured to initiate the action based on the first undesirable characteristic or the second undesirable characteristic.

11. The AM continuous welding system of claim 1, further comprising a display device, and wherein to initiate the action based on the first undesirable characteristic, the controller is configured to present a message on the display device.

12. The AM continuous welding system of claim 11, wherein the message comprises an image that depicts the work piece in a partially completed state that corresponds to an actual partially completed state of the work piece, and identifies a location of the first undesirable characteristic with respect to the work piece.

13. The AM continuous welding system of claim 1, wherein to initiate the action based on the first undesirable characteristic, the controller is configured to halt processing of the AM continuous welding system.

14. The AM continuous welding system of claim 1, wherein the heat source comprises an electron beam.

15. The AM continuous welding system of claim 1, wherein the heat source comprises a laser beam.

16. The AM continuous welding system of claim 1, wherein the first eddy current sensor array is configured to be positioned a distance from the re-solidified feedstock segment.

17. A method for additive manufacturing (AM) comprising:
 emitting feedstock at a designated location, the feedstock comprising a wire;
 heating the feedstock with a heat source;
 generating a plurality of sensor signals while in current-sensing proximity of a re-solidified feedstock segment;
 determining, by a controller comprising a processor, based on the first plurality of sensor signals, a first characteristic of the re-solidified feedstock segment;
 determining that the first characteristic of the re-solidified feedstock segment is an undesirable characteristic, wherein the first undesirable characteristic of the re-solidified feedstock segment comprises a separation of the re-solidified feedstock segment from a previous re-solidified feedstock segment;
 determining the separation of the re-solidified feedstock segment from the previous re-solidified feedstock segment;
 determining that the separation is less than a predetermined threshold; and
 initiating an action based on the undesirable characteristic by increasing an interpass time period that identifies a wait period between each successive feedstock segment.

18. The method of claim 17, wherein determining, based on the first plurality of sensor signals, the first undesirable characteristic of the re-solidified feedstock segment comprises determining, based on the first plurality of sensor signals, an actual location of the re-solidified feedstock segment; and further comprising:
 accessing slice data that identifies a specified location of the re-solidified feedstock segment;
 comparing the actual location of the re-solidified feedstock segment to the specified location of the re-solidified feedstock segment to determine a location deviation;
 determining that the location deviation exceeds a predetermined threshold; and
 wherein initiating the action based on the first undesirable characteristic comprises altering a parameter of the AM continuous welding system to reduce a location deviation of a subsequent re-solidified feedstock segment.

* * * * *